United States Patent
Hopper

(10) Patent No.: US 7,422,459 B2
(45) Date of Patent: Sep. 9, 2008

(54) THERMOCOUPLES AND RESISTANCE TEMPERATURE DETECTORS OIL-WICKING SEAL FITTING

(76) Inventor: Troy K. Hopper, c/o Thermo/Probes Inc., 55 Lyerly, Suite 214, Houston, TX (US) 77022

( * ) Notice: Subject to any disclaimer, the term of this patent is extended or adjusted under 35 U.S.C. 154(b) by 0 days.

(21) Appl. No.: 10/821,217

(22) Filed: Apr. 8, 2004

(65) Prior Publication Data

US 2005/0227526 A1    Oct. 13, 2005

(51) Int. Cl.
*H01R 13/62* (2006.01)
(52) U.S. Cl. .................................................. 439/302
(58) Field of Classification Search ......... 439/578–585, 439/811, 812, 302, 573, 277
See application file for complete search history.

(56) References Cited

U.S. PATENT DOCUMENTS

| | | | |
|---|---|---|---|
| 2,849,518 A | | 8/1958 | MacDonald ................ 136/4 |
| 2,963,532 A | | 12/1960 | Bell ........................... 136/4 |
| 3,015,084 A | * | 12/1961 | Gribble ...................... 439/812 |
| 4,070,086 A | * | 1/1978 | Trafford ..................... 439/717 |
| 4,072,393 A | * | 2/1978 | McDermott et al. ......... 439/811 |
| 4,511,204 A | * | 4/1985 | Glenn ........................ 439/625 |
| 4,556,271 A | * | 12/1985 | Hubbard .................... 439/277 |
| 4,690,482 A | * | 9/1987 | Chamberland et al. ...... 439/578 |
| 6,364,702 B1 | * | 4/2002 | Mochizuki et al. .......... 439/579 |
| 6,561,848 B1 | * | 5/2003 | Khemakhem et al. ....... 439/580 |
| 6,575,784 B1 | * | 6/2003 | Yamada ..................... 439/578 |
| 6,783,395 B2 | * | 8/2004 | Khemakhem et al. ....... 439/580 |

OTHER PUBLICATIONS

Comax Buffalo Technologies (Buffalo, NY) Catalog 5001A, "Pressure and Vacuum Sealing Assemblies," date unknown, but catalog indicates a 1998 copyright date and is printed with the words "Issued Jun. 1998".
Minco Products, Inc., (Minneapolis, MN), Bulletin TS-103, "Temperature Sensors & Instruments," pp. 1 - 4-14, date unknown.

* cited by examiner

*Primary Examiner*—Alexander Gilman
(74) *Attorney, Agent, or Firm*—Mark R. Wisner

(57) ABSTRACT

A seal fitting for use in connecting the lead wire from the sensor on one side of bulkhead or housing to a thermocouple (TC) or resistance temperature detector (RTD) on the other side of the sensor or housing, intended for use in applications in which the sensor is located in oil, and usually oil under pressure, such as in a turbine or compressor. The seal fitting is mounted to a port on the bulkhead/housing and includes means for clamping the lead wire from the TC or RTD sensor in electrical contact with a male conductive pin and means for clamping the lead wire from the TC or RTD in electrical contact with a female conductive pin. Both the male conductive pin and the female conductive pin are enclosed within male and female connectors that are assembled in such a way that the conductive pin passes through a ceramic to metal seal at a ceramic insulator to both seal electrically and prevent wicking of the oil along the wires.

8 Claims, 2 Drawing Sheets

THERMOCOUPLES AND RESISTANCE TEMPERATURE DETECTORS OIL-WICKING SEAL FITTING

BACKGROUND OF THE INVENTION

The present invention relates to a seal fitting for use with thermocouples, resistance temperature detectors (RTDs), and other sensors for monitoring temperature and other physical properties of lubricants and other fluids contained in a confined space, and particularly, for use with fluids that are under vacuum, pressure, and/or high flow rates such as in bearings or in turbine generators, motors, and/or compressors.

The difficulty in preventing the passage of a fluid from a sealed or confined space along the thermocouple or RTD leads exiting past the seals is well known. Through long experience, the manufacturers of machinery such as turbine generators, motors, and compressors have come to expect that lubricant will escape along the lead wires that output signals from a temperature sensor in the lubricant to a gauge or central processing unit (CPU) for monitoring operation of the machinery. So far as is known, no seal is available that effectively prevents the so-called oil wicking of such fluids from a confined space in which the fluid is contained along the thermocouple or RTD wires. The problem is exacerbated by the vacuum, pressure, and/or flow rate of the fluid (in the case of machinery such as turbines and compressors) and by such factors as the viscosity of the fluid, flow rate, temperature, and other physical and operating properties of the machinery and the fluid.

It is, therefore, an object of the present invention to provide a seal fitting that effectively resists passage of fluid from within a confined space along the leads that extend from a thermocouple, probe, RTD, or other sensor positioned on one side of the housing or bulkhead in which the fluid is contained in a confined space to a gauge or other circuitry at which physical properties of the fluid are monitored.

Another object of the present invention is to provide a seal fitting in which the component parts of the fitting can be changed so quickly and conveniently, and without dissassembling the fitting, that routine maintenance can be accomplished without interrupting the operation of the machinery.

Another object of the present invention is to provide a seal fitting that is capable of being used for connecting lead and instrument wires of various sizes (gauges) while still maintaining an effective seal against oil wicking.

Other objects, and the advantages, of the present invention will be made clear to those skilled in the art by the following description of the presently preferred embodiments thereof.

SUMMARY OF THE INVENTION

These objects are achieved by providing a seal fitting for connecting the lead wire of a thermocouple (TC) or resistance temperature detector (RTD) sensor positioned on one side of a bulkhead or housing to the lead wire of the TC or RTD positioned on the other side of the bulkhead comprising a shell, means in the housing for clamping the lead wire from the sensor of the TC or RTD, and a ceramic disk retained in the housing in spaced relationship with the sensor wire clamp. A male conductive pin with one end in contact with the sensor wire clamping means extends through the ceramic disk with the ceramic material comprising the disk sealing against the male conductive pin. A tube that is filled with an insulating material is engaged to the shell with the ceramic disk interposed between the tube and the sensor wire clamping means and a female conductive pin extends through the insulating material in the tube into contact with the male conductive pin. The female conductive pin in the tube is also in contact with means for clamping a lead wire from the TC or RTD. Although not limited to this use, the seal fitting of the present invention is intended for use in applications in which it connects the above-described lead wire from a sensor that is positioned on one side of a bulkhead and a lead wire from an instrument that is positioned on the other side of the bulkhead.

DETAILED DESCRIPTION OF THE PREFERRED EMBODIMENT

Figure 1:
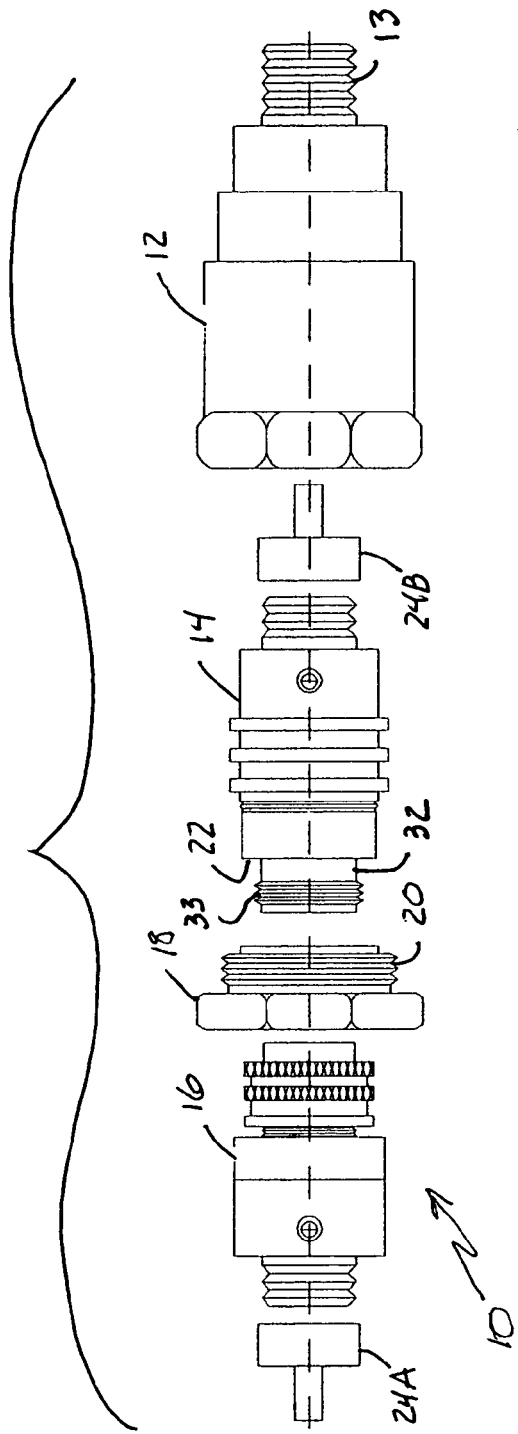
FIG. 1 is a side elevational, exploded view of a preferred embodiment of a thermocouple and RTD connector constructed in accordance with the teachings of the present invention.

Referring to the figures, a preferred embodiment of a seal fitting constructed in accordance with the teachings of the present invention is indicated generally at reference numeral 10. Seal fitting 10 comprises a body fitting 12, preferably comprised of metal, and male and female connectors 14 and 16, respectively. As shown in FIG. 2, the male and female connectors 14, 16 are assembled to each other with a concentric nut 18 having threads 20 thereon for mating with the internal threads (not shown) in one end of body fitting 12 for retaining body fitting 12 over the male connector 14. An internal shoulder (not shown) on nut 18 bears against the shoulder 22 formed on male connector 14 to trap the male connector 14 between nut 18 and inside body fitting 12. Strain reliefs 24A, 24B are provided at each end of the male-female connector assembly and the outside diameter (O.D.) of male connector 14 is provided with one or more (three being shown in the figures) raised headers, or annular rings, 26 having grooves 28 therebetween for receiving an O-ring (not shown in FIGS. 1 or 2, but shown in sectional view in FIG. 3) therein for sealing against the inside diameter (I.D.) of body fitting 12 when the male connector 14 is received therein. In the preferred embodiment shown, each of the male and female connectors 14, 16, as well as the nut 18 and strain reliefs 24, are comprised of metal, preferably stainless steel, but those skilled in the art who have the benefit of this disclosure will recognize that it is not a requirement of the present invention that these parts be made of metal to function in the manner intended to accomplish their intended purpose.

Although not limited to this application, in one application, the seal fitting 10 is utilized to connect the lead wire(s) from the sensor of a thermocouple (TC) or resistance temperature detector (RTD) that is positioned in an oil bath of, for instance, a turbine or compressor, and the body fitting 12 screws into the port of a housing or bulkhead (not shown) in which the oil is contained on the screw threads 13 formed at the end of body fitting 12. The lead wire from the sensor for the TC or RTD, or more usually, more than one such lead wires, extends out of the housing through the port. As set out below, provision is made in the embodiment shown for connecting four such sensor lead wires to an instrument for providing information as to the temperature of the oil in the housing, but those skilled in the art will recognize that the seal fitting of the present invention is utilized to advantage for connecting one, two, four, six, or however many TC or RTD sensor lead wires as is needed in a particular application to the lead wires from their respective TCs or RTDs. For this reason, one end of seal fitting 10 (shown at the right in FIG. 1) is designated as the oil side of the connector and the other end (shown at the left in FIG. 1) is the instrument side. This right/left oil/instrument orientation is maintained throughout FIGS. 1–5.

Figure 2:
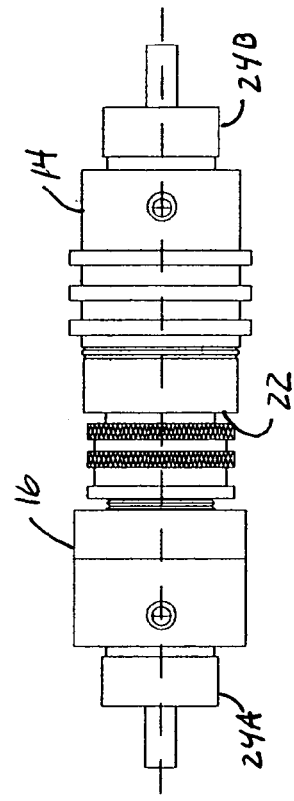
FIG. 2 is a side elevational view of the connector of FIG. 1 with the body fitting removed to show the assembled male-female halves of the thermocouple and RTD connector of the present invention.
Figure 3:
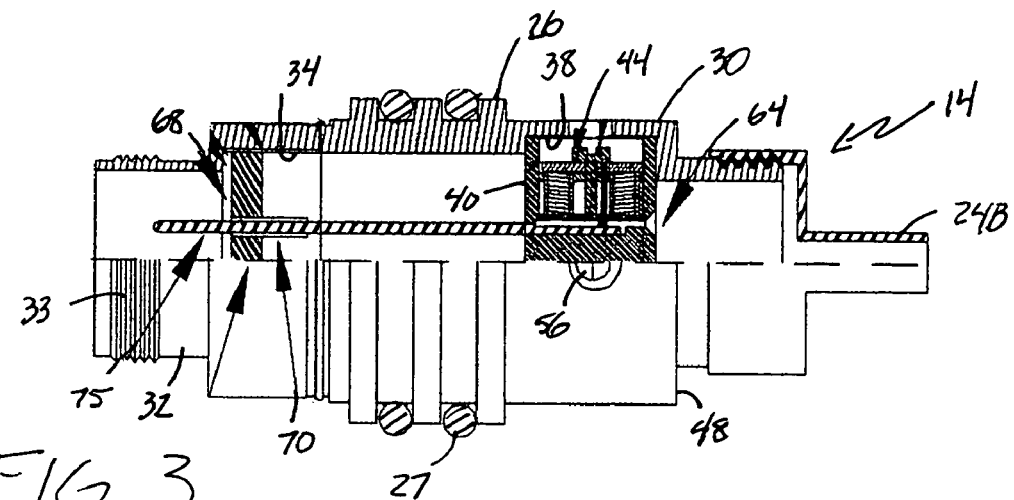
FIG. 3 is a longitudinal sectional view of the male connector of the thermocouple and RTD connector of FIG. 1.

As shown in FIG. 3, in which the male connector 14 of FIGS. 1 and 2 is shown in enlarged, sectional detail, male connector 14 comprises an elongate, tubular shell 30. An adapter 32 is welded around the transition sleeve 34 at the end of shell 30 opposite the strain relief 24B, the weld between shell 30 and adapter 32 being indicated at reference numeral 36. The inside diameter (I.D.) of shell 30 is enlarged in the portion 38 and a spacer 40 is positioned in the enlarged I.D. portion 38 at the end proximate strain relief 24B. As best shown by reference to FIG. 4, a notch 42, or in the case of the embodiment shown, four notches spaced at approximately 90° intervals, is formed in spacer 40 and a clamp, indicated generally at reference numeral 44, for clamping a lead wire (not shown) is positioned in notch 42. The clamp 44 is retained within notch 42 by a spacer cap 46 that is trapped between spacer 40 and the stepdown 48 formed in the shell 30 of male connector 14. As explained in more detail below, spacer 40 and spacer cap 46 are preferably comprised of a thermoplastic material such as PEEK or PEKK, and in a particularly preferred embodiment, the cap 46 is adhered to spacer 40 as well as being trapped between spacer 40 and stepdown 48.

Figure 4:
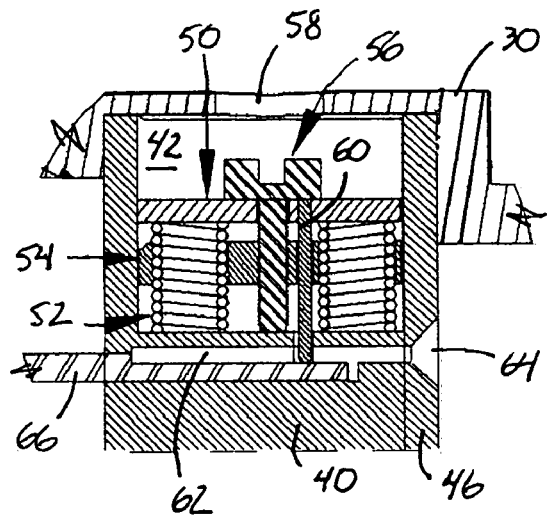
FIG. 4 is a detailed sectional view of a portion of FIG. 3.

As best shown in FIG. 4, clamp 44 is comprised of a clamping tab 50 that is biased radially outwardly from the longitudinal axis of male connector 14 on two coil springs 52, the springs 52 being maintained in the desired upright position in notch 42 by a threaded tab 54 positioned between the underside of clamping tab 50 and the inside walls of the notch 42 and spacer cap 46. A cap screw 56 extends down through a threaded hole (not numbered) in clamping tab 50 and, when turned by a screwdriver or other implement (not shown) inserted through the hole 58 in the shell 30 of male connector 14, cap screw 56 moves the clamping tab 50 either away from or towards (the latter being in a direction against the bias applied to clamping tab 50 by springs 52) the longitudinal axis of male connector 14 on the threads in threaded tab 54. For purposes of convenience, the directions of movement of clamping tab 50 are referred to herein as being radially outwardly (with the bias applied by springs 52) or inwardly (against the bias applied by springs 52) with respect to the longitudinal axis of the substantially cylindrical male connector 14.

Although not required for clamp 44 to function in the manner described, the threaded tab 54 is preferably comprised of a thermoplastic such as PEEK or PEKK and preferably adhered to spacer 40 and spacer cap 46 in the same manner in which spacer cap 46 is adhered to spacer 40. A prong 60 is affixed to clamping tab 50 and extends radially inwardly (toward the longitudinal axis of male connector 14) through a hole (not numbered) in spacer 40 into a bore 62 that extends into spacer 40 in a direction substantially parallel to the longitudinal axis of male connector 14. Bore 62 opens through a hole 64 in spacer cap 42 to form a receptacle for insertion of the above-described lead wire (not shown) from the sensor for the TC or RTD and clamping of the sensor lead wire as cap screw 56 is tightened to cause the prong 60 to engage the lead wire.

Referring again to FIG. 3, it can be seen that a portion of the bore 62 in spacer 40 is provided with a metal conductive pin 66 that extends longitudinally (in a direction substantially parallel to the longitudinal axis) in the shell 30 of male connector 14 from spacer 40 through a hole (not numbered) in an insulating disk 68 positioned in shell 30 at the end opposite strain relief 24B. Clamping the lead wire in bore 62 by tightening cap screw 56 causes the lead wire to be pushed into electrical contact with conductive pin 66 by prong 60. A tube 70 surrounds the conductive pin 66 as it passes through the hole in insulator 68. Tube 70 and transition sleeve 34 are preferably both comprised of a nickel iron alloy (Chromel, for instance), and insulating disk 68 is preferably comprised of alumina or other highly insulative ceramic material. The combination of the weld 36 and insulating disk 68 provides a hermetic seal between the sensor in the oil bath or reservoir on one side of the bulkhead and the TC or RTD on the other side.

Figure 5:
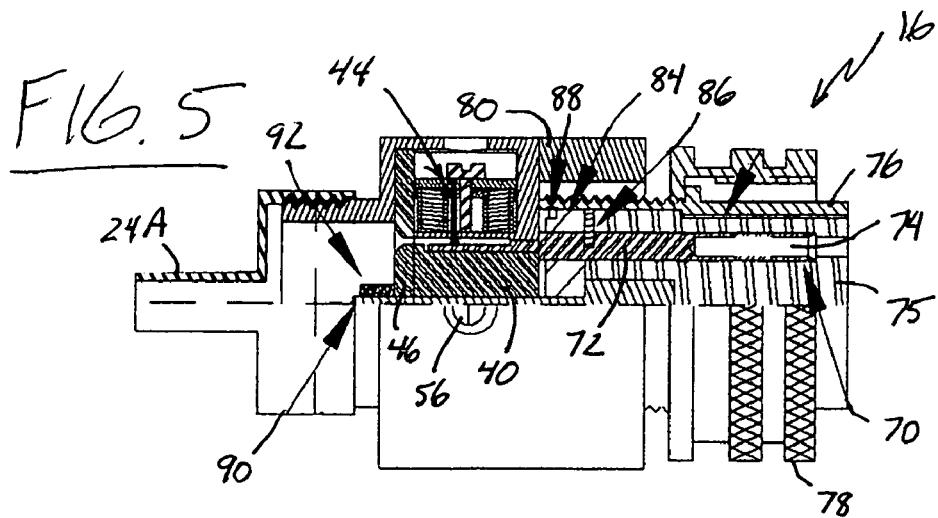
FIG. 5 is a longitudinal sectional view of the female connector of the thermocouple and RTD connector of FIG. 1.

Referring now to FIG. 5, female connector 16 is shown in enlarged sectional view. Insofar as the parts of the clamp 44 in female connector 16 are identical to those of the clamp 44 shown and described above in connection with FIGS. 3 and 4, the same reference numerals are used in the clamp 44 in FIG. 5. The clamp 44 of female connector 16 clamps a lead wire from the TC or RTD in a bore 62 in spacer 40 in the same manner in which the lead wire from the sensor for the TC or RTD is clamped in the above-described male connector 14, but the end of the longitudinally-extending female conductive pin 72 of female connector 16 terminates in a receptacle 74 for receiving the end portion 75 of the male conductive pin 66 that extends through the insulating disk 68 in male connector 14 (hence the designation of the two portions of seal fitting 10 as the male 14 and female 16 connectors). By receipt of male conductive pin 66 in the receptacle 74 of female conductive pin 72, current can pass through seal fitting 10, but a seal is established against the migration of any oil (or other moisture) through connector along the lead wires, hence the designation of the connector of the present invention as a non-oil wicking seal fitting.

Female conductive pin 72 extends longitudinally through a main spacer 75 confined within the sleeve 76 comprising a portion of female connector 16. A main nut 78 is placed over sleeve 76 before sleeve 76 is threaded onto a backnut 80 and bears against the shoulder 82 formed on sleeve 76 when male connector 14 is assembled to female connector 16 so that the internal threads of main nut 78 engage the threads 33 on the O.D. of the adapter 32 at the end of male connector 14 opposite strain relief 24B to draw the male and female connectors 14, 16 together. Sleeve 76 fits over a retaining spacer 84, both main spacer 75 and retaining spacer 84 preferably being comprised of a plastic, or even more preferably, a thermoplastic material as described above, to provide insulation around conductor 72. An orientation pin 86 is provided for orienting the conductors 72 during assembly of sleeve 76 to the spacer 40, backnut 80, and retaining spacer 84, and a retaining pin 90 having a retaining ring 88 welded or otherwise affixed thereto on one end and a retaining collar 92 welded or otherwise affixed thereto on the other end extends through the component parts 72, 75, 76, and 84 to hold the component parts 72, 75, 76, and 84 to the spacer 40 of female connector 16.

Those skilled in the art who have the benefit of this disclosure will recognize that certain changes can be made to the component parts of the apparatus of the present invention without changing the manner in which those parts function to achieve their intended result. All such changes, and others which will be clear to those skilled in the art from this description of the preferred embodiments of the invention, are intended to fall within the scope of the following, non-limiting claims.

What is claimed is:

1. A seal fitting for connecting a thermocouple (TC) or resistance temperature detector (RTD) to a lead wire from a sensor comprising:
   a shell;
   means retained to said shell for clamping a lead wire from a TC or RTD sensor;
   a ceramic disk retained in said shell in spaced relationship to said sensor wire clamping means;
   a male conductive pin with one end in electrical contact with said sensor wire clamping means and the other end extending through said ceramic disk, the ceramic material comprising said disk sealing against said conductive pin;
   a female conductive pin in electrical contact with said male conductive pin;
   means in electrical contact with said female conductive pin for clamping a lead wire from the TC or RTD; and
   each of said wire clamping means comprising a clamping tab, a receptacle, a spring, a screw, and a threaded tab, the spring biasing the clamping tab away from the receptacle and the screw tightening the clamping tab against the respective lead wire or sensor wire received in the receptacle, the spring being confined by and threaded through the threaded tab.

2. The seal fitting of claim 1 additionally comprising a body for engaging a bulkhead, said shell being provided with a groove for receiving an O-ring therein for sealing against said body.

3. The seal fitting of claim 1 wherein said ceramic disk and said sensor wire clamping means are located at opposite ends of said shell.

4. A seal fitting for connecting a thermocouple (TC) or resistance temperature detector (RTD) to a lead wire from a sensor comprising:
   male and female connectors forming a shell when engaged to each other;
   means retained in said male connector for clamping a lead wire from a TC or RTD sensor;
   means retained in said female connector for clamping a lead wire from the TC or RTD;
   an insulating disk retained in the shell formed by said male and female connectors between said sensor wire clamping means and said lead wire clamping means;
   a male conductive pin with one end in electrical contact with said sensor wire clamping means and the other end extending through said insulating disk;
   a female conductive pin in electrical contact with said lead wire clamping means at one end and with said male conductive pin at the other end; and
   each of said lead wire clamping means and said sensor wire clamping means comprising a tab for tightening against said respective lead wire or sensor wire, said tab being biased away from a receptacle for receiving the respective lead wire or sensor wire by a spring.

5. The seal fitting of claim 4 wherein the spring for biasing said clamping tab is confined by a threaded tab.

6. The seal fitting of claim 4 wherein the spring for biasing said clamping tab is threaded through a threaded tab.

7. The seal fitting of claim 4 additionally comprising a body for engaging a bulkhead, the shell comprised of said male and female connectors being provided with a groove for receiving an O-ring therein for sealing against said body.

8. The seal fitting of claim 4 wherein said lead wire clamping means and said sensor wire clamping means are located at opposite ends of the shell.

* * * * *